United States Patent [19]

Cookson et al.

[11] 4,400,578

[45] Aug. 23, 1983

[54] HIGH VOLTAGE GAS INSULATED TRANSMISSION LINE WITH CONTINUOUS PARTICLE TRAPPING

[75] Inventors: Alan H. Cookson, Pittsburgh; Steinar J. Dale, Monroeville, both of Pa.,

[73] Assignee: The United States of America as represented by the U.S. Department of Energy, Washington, D.C.

[21] Appl. No.: 243,213

[22] Filed: Mar. 12, 1981

[51] Int. Cl.³ ................ H01B 9/06; H01B 9/04; H02G 5/06
[52] U.S. Cl. .................................. 174/14 R; 174/28
[58] Field of Search ............ 174/14 R, 16 B, 27, 174/28, 29, 99 R, 99 B; 307/147; 361/233

[56] References Cited

U.S. PATENT DOCUMENTS

| | | | |
|---|---|---|---|
| 3,515,939 | 6/1970 | Trump | 174/14 R X |
| 3,792,188 | 2/1974 | Cronin | 174/14 R X |
| 4,034,147 | 7/1977 | Clark et al. | 174/14 R |
| 4,064,354 | 12/1977 | Cookson | 174/14 R X |
| 4,122,298 | 10/1978 | Brandt | 174/28 |

*Primary Examiner*—Laramie E. Askin
*Attorney, Agent, or Firm*—Benjamin Hudson, Jr.

[57] ABSTRACT

This invention provides a novel high voltage gas insulated transmission line utilizing insulating supports spaced at intervals with snap-in means for supporting a continuous trapping apparatus and said trapping apparatus having perforations and cutouts to facilitate trapping of contaminating particles and system flexibility.

20 Claims, 12 Drawing Figures

HIGH VOLTAGE GAS INSULATED TRANSMISSION LINE WITH CONTINUOUS PARTICLE TRAPPING

BACKGROUND OF THE INVENTION

1. Field of the Invention

This invention relates to high voltage gas insulated transmission lines and more particularly to gas insulated transmission lines having trapping means disposed to remove contaminating particles within the transmission lines.

2. Description of the Prior Art

Gas insulated transmission lines are generally comprised of an outer housing with a center conductor coaxially mounted within the outer housing. The center conductor is conventionally supported by insulating spacers located at intervals along the axis of the transmission line. The line is pressurized with an inert insulating gas medium. The insulating gas is conventionally $SF_6$.

It has been found that upon installation of the transmission line, dust or other contaminating conducting particles may be left in the system and become charged in the high electric field developed. The AC voltage creates a high AC electric field gradient which alternately lifts and drops the particles and can result in random longitudinal motion within the transmission line. These particles may eventually receive enough energy from the electric field to cross the gap between the outer housing and the center conductor mounted therein, and this can result in high voltage breakdown and failure of the system.

Many methods have been proposed to eliminate the contaminating particles from the transmission lines with some type of trapping means. These methods normally comprise some type of apparatus that creates a low electric field region within the transmission line that is disposed to catch and trap contaminating particles as they move down the line. Examples of such particle traps are found in the U.S. Pat. No. 3,515,939 issued to J. G. Trump and U.S. Pat. No. 4,034,147 issued to R. M. Clark et al. The contaminating particle trap devices disclosed in these patents and similar designs all work with varying degrees of efficiency and effectiveness. There is an ongoing effort by power system engineers to reduce the size and cost of these systems. Reduction in the size of a gas insulated transmission line results in a much higher electric field for the same voltage. This makes efficient particles traps even more critical as particles become more active and deleterious with increasing fields. Another patent of particular interest is U.S. Pat. No. 3,792,188 issued to J. C. Cronin disclosing a corrugated outer housing with the low field regions in the valleys of the corrugated housing. It has been found that higher electric fields greatly reduces the effectiveness of these systems requiring additional trapping means.

SUMMARY OF THE INVENTION

There is provided by this invention a high voltage gas insulated transmission line having a continuous particle trapping means supported throughout the length of the line that gives improved efficiency and effectiveness in removing the contaminating particles. This continuous particle trapping means also is flexible enough to maintain its effectiveness in flexible gas insulated transmission systems where the contour may change with the land profile.

BRIEF DESCRIPTION OF THE PREFERRED EMBODIMENT

Figure 1:
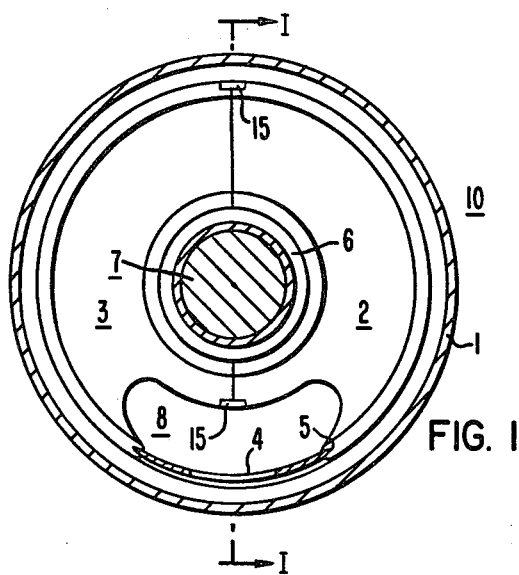
FIG. 1 is a radial cross-section of a gas insulated transmission line with a contaminating particle trap incorporating the principles of this invention.

There is shown in FIG. 1 a radial cross-section of a gas insulated transmission line 10. Low dielectric constant insulating supports 2 and 3 support a conducting cable 7 having a corrugated shielding 6 within an outer aluminum corrugated housing 1. The insulating support members 2 and 3 have slotted openings 5 that are used to support a generally curved metallic trapping apparatus 4. The two insulating support members 2 and 3 may be joined together by any conventional plastic clamps or fasteners 15. They may also be formed as a single molded integral part. The transmission line is pressurized with an insulating medium 8, preferably $SF_6$ gas.

Figure 2:
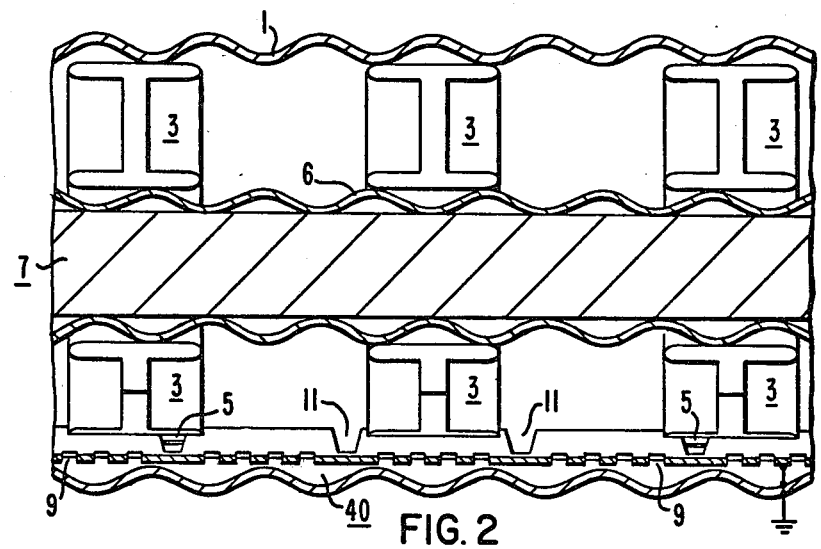
FIG. 2 is an axial cross-section of the transmission line shown in FIG. 1 taken along line I—I in FIG. 1.
Figure 3:
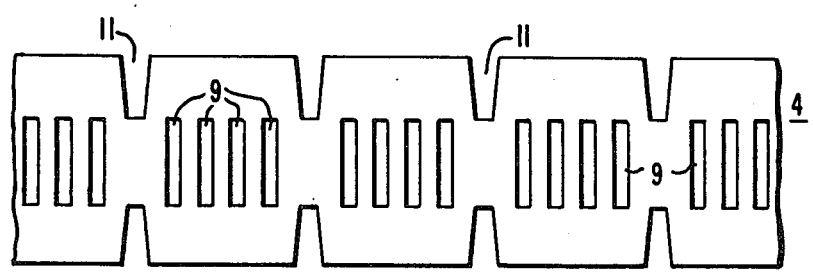
FIG. 3 is an isolated view of the particle trapping apparatus incorporating the principles of this invention.

As can be seen in FIGS. 2 and 3 the curved metal trapping apparatus 4 is generally comprised of a perforated metal strip which should be thin aluminum for best results. The aluminum perforated strip 4 fits into the slotted openings 5 of the insulating support members and is supported just above the corrugated outer housing 1. Using a grounding strap or some similar type of grounding means the metallic strip is firmly grounded to the outer housing 1. The metallic strip 4 has slotted perforations 9. The ratio of the width of the slotted perforations 9 to the gap between the metal strip 4 and the outer housing 1 should be in an approximate range of 3-5 for best results. The metallic strip 4 has cutouts 11 in its edges. These cutouts are designed to give the strip flexibility when used in flexible systems while at the same time working in combination with the slotted perforations 9 to trap particles.

As shown in FIGS. 1-3 and 10 the gas insulated transmission line 10 provides a continuous low field region 40 for trapping contaminating particles under the metallic strip 4 being supported at intervals of approximately 5 feet by the slotted openings 5 of the insulating support members. This method of supporting the metallic strip provides a firm rigid trap throughout the system. At the same time, however, the cutouts 11 give the trapping apparatus the flexibility to be applied to flexible outdoor systems.

Figure 5:
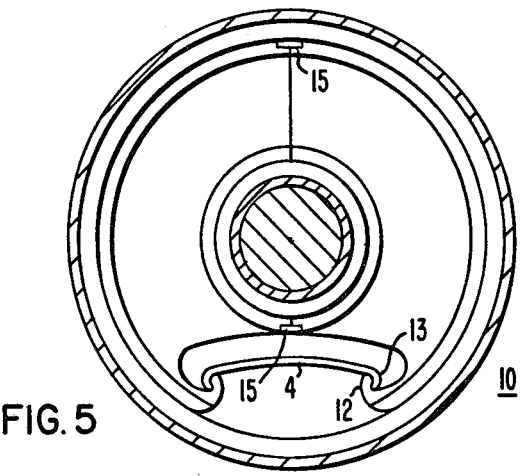
FIGS. 4 and 5 are views similar to FIG. 1 showing modifications of the particle trap.
Figure 4:
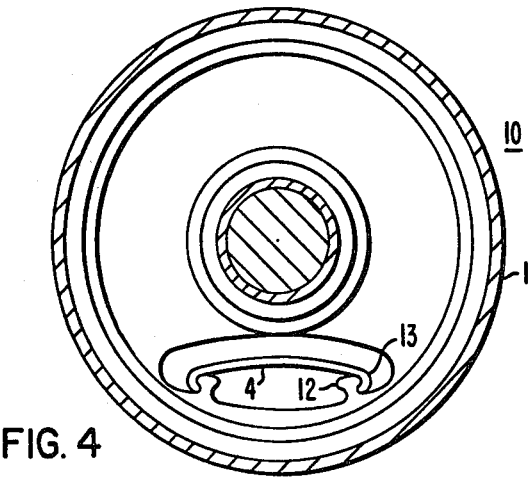

Referring now to FIGS. 4 and 5 there is shown another embodiment of a gas insulated transmission line wherein the low dielectric constant insulating supports are comprised of generally curved hooked ends 12. The insulating support members may have a two part construction as shown in FIG. 5 with conventional plastic fasteners 15 or they may be a one piece molded construction as shown in FIG. 4. The metallic perforated strip 4 is also generally curved having hooked ends 13 designed to connect and be supported by the hooked ends 12 of the insulating supports.

Figure 6:
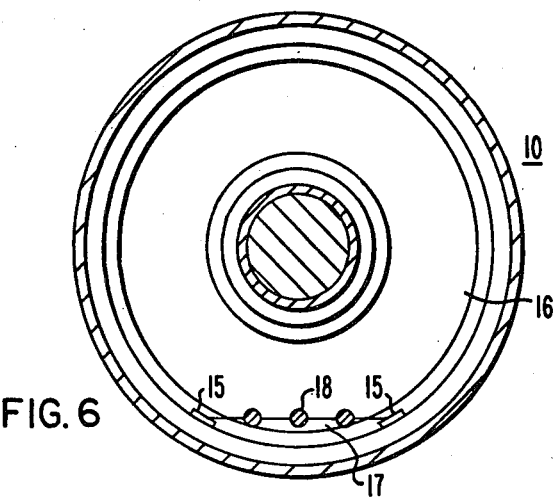
FIGS. 6 and 7 are radial cross-sections of a gas insulating transmission line utilizing a rod or plurality of rods as a trapping apparatus in accordance with the principles of this invention.
Figure 8:
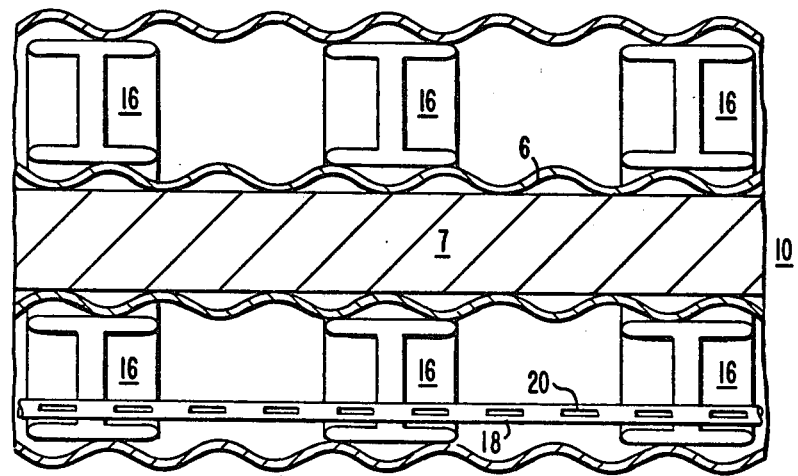
FIG. 8 is an axial cross-section of the transmission line constructed in accordance with FIG. 6 or FIG. 7.
Figure 7:
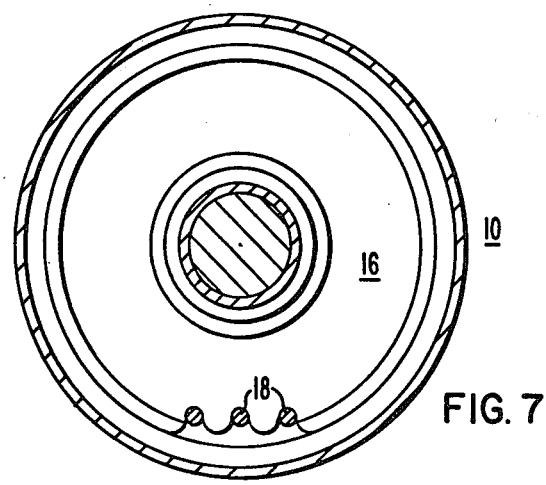

Referring now to FIGS. 6-8 there is shown another embodiment of the invention wherein a metallic rod 18 or a plurality of rods are utilized in place of the metallic strip. The rod 18 may have perforations or cutouts 20 as shown in FIG. 8 in accordance with the principles of this invention. The insulating supports 16 may have slots to facilitate a snap in connection as shown in FIG. 7 or a lower member 17 may be attached by plastic fasteners 15 to hold the rods in place as shown in FIG. 6.

Figure 9:
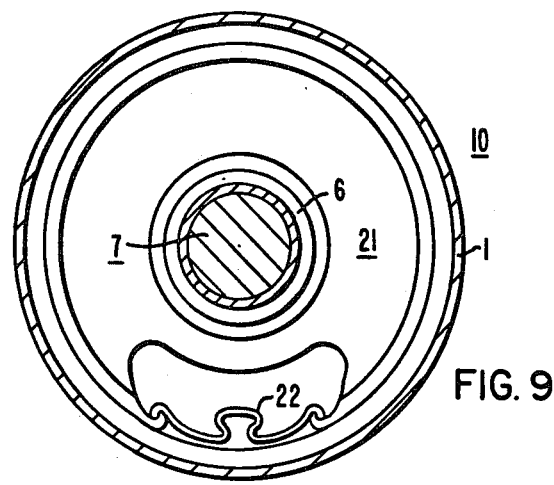
FIG. 9 is a radial cross-section of a gas insulated transmission line utilizing a channel as a trapping apparatus in accordance with the principles of this invention.
Figure 11:
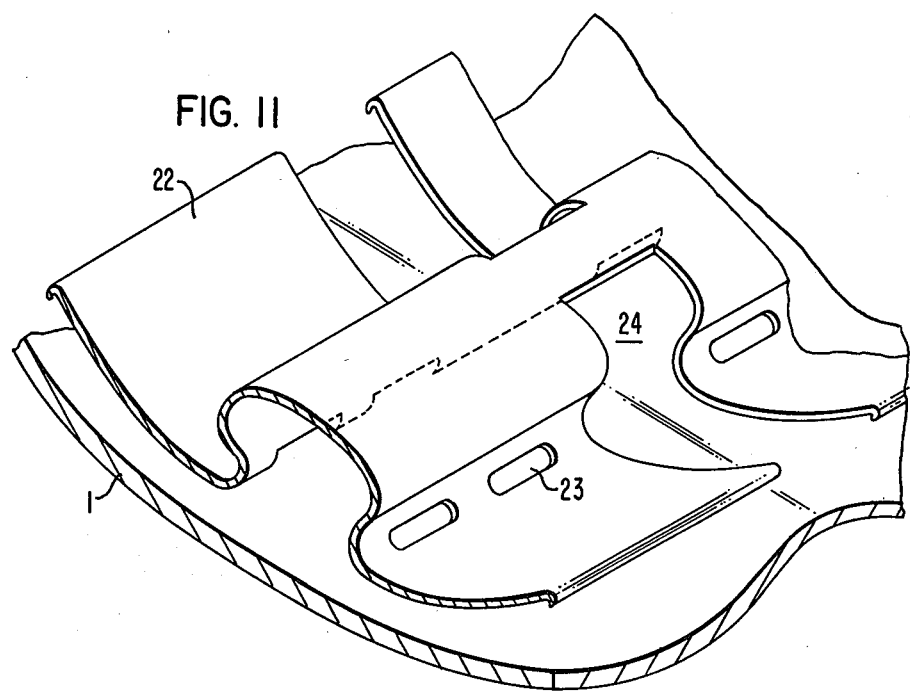
FIG. 11 is an isolated sectional view of the trapping apparatus shown in FIG. 9.
Figure 10:
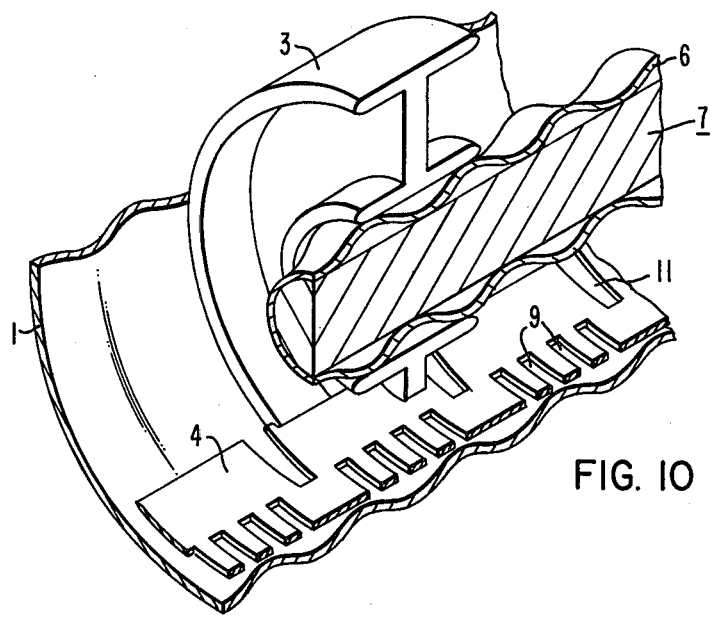
FIG. 10 is a sectional perspective view of the transmission line shown in FIG. 1.

FIGS. 9 and 11 show an embodiment of the invention wherein a perforated channel 22 is utilized as the trapping apparatus. The insulating support member 21 may be a one piece molded construction or a two piece construction as heretofore described. Also, the channel 22 may be supported utilizing the slotted support method or the hooked end support method in accordance with the principles of this invention. The channel 22 is generally comprised of curvilinear surfaces to facilitate movement of contaminating particles into the slotted openings 23. The cutouts 24 are provided to give the channel flexibility for use in flexible systems and also serve to aid in trapping particles within the channel.

Figure 12:
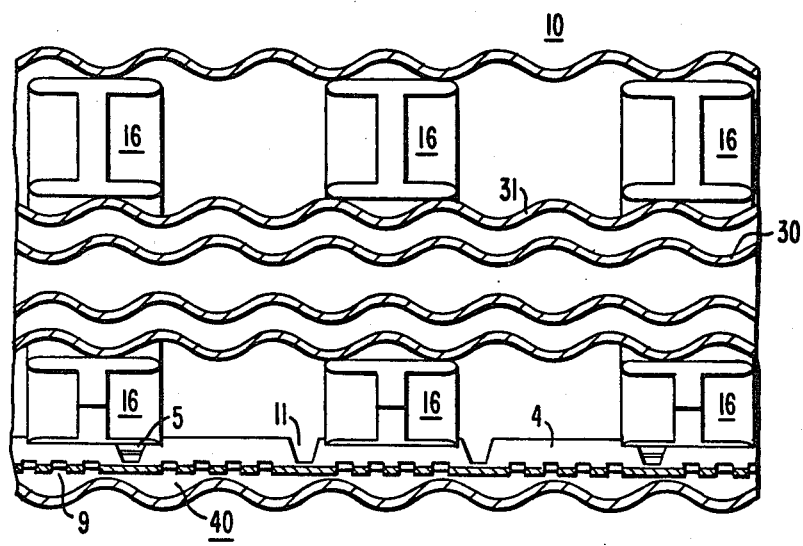
FIG. 12 is an axial cross-section of another embodiment of a transmission line incorporating the principles of this invention.

FIG. 12 illustrates an alternate embodiment of the present invention wherein the electric conductor is comprised of two concentric corrugated conductors 30 and 31 disposed such that 30 can move longitudinally inside 31 for the initial assembly and allows flexibility of the assembly in cooperation with the metallic strip 4.

From the foregoing, it can be readily seen that there is provided by this invention an improved gas insulated transmission line utilizing novel means for supporting a trapping apparatus that gives greater efficiency and reliability in removing contaminating particles while at the same time being flexible enough to function effectively in flexible systems.

Although there has been illustrated and described specific structures, it is to be clearly understood that the same were merely for purposes of illustration and that changes and modifications may readily be made therein by those skilled in the art without departing from the spirit and scope of the invention.

We claim:

1. A high voltage gas insulated transmission line, comprising:
   (a) an elongated corrugated conductive outer housing;
   (b) an insulating gas disposed within said elongated corrugated conductive outer housing;
   (c) an elongated conductor mounted within said elongated corrugated conductive outer housing;
   (d) insulating means disposed within said elongated corrugated conductive outer housing for supporting said elongated conductor;
   (e) a perforated elongated metallic strip disposed within said elongated corrugated conductive outer housing continuous throughout the length of the transmission line, said perforated elongated metallic strip having a plurality of cutouts in its edges for flexibility and being supported by said insulating means in close proximity to said elongated corrugated conductive outer housing; and
   (f) grounding means for making a solid electrical connection between said perforated elongated metallic strip and said elongated corrugated conductive outer housing whereby said perforated elongated metallic strip in combination with low concavity regions interiorly of said elongated corrugated conductive outer housing create low electric field regions to trap particles.

2. A high voltage gas insulated transmission line as recited in claim 1 wherein said elongated conductor is comprised of a conducting cable mounted in a corrugated metallic housing.

3. A high voltage gas insulated transmission line as recited in claim 1 wherein said insulating means has slot means for supporting said perforated elongated metallic strip.

4. A high voltage gas insulated transmission line as recited in claim 1 wherein said insulating means is generally comprised of two parts of low dielectric constant material each having slot means for supporting said perforated elongated metallic strip, said two parts being combined as one and supporting said perforated elongated metallic strip in said slot means.

5. A high voltage gas insulated transmission line as recited in claim 1 wherein said insulating means is comprised of a generally curved configuration having a first pair of hooked ends disposed to support said perforated elongated metallic strip.

6. A high voltage gas insulated transmission line as recited in claim 5 wherein said perforated elongated metallic strip is generally comprised of a curved configuration having a second pair of hooked ends disposed to connect with said first pair of hooked ends on said insulating means and be supported thereby.

7. A high voltage gas insulated transmission line, comprising:
   (a) an elongated corrugated conductive outer housing;
   (b) an insulating gas disposed within said elongated corrugated conductive outer housing;
   (c) an elongated conductor mounted within said elongated corrugated conductive outer housing;
   (d) insulating means disposed within said elongated corrugated conductive outer housing for supporting said elongated conductor;
   (e) an elongated perforated conductive channel means disposed within said elongated corrugated conductive outer housing continuous throughout the length of the transmission line, said elongated perforated conductive channel means having a plurality of cutouts in its edges for a flexibility and being supported by said insulating means in close proximity to said elongated corrugated conductive outer housing; and
   (f) grounding means for making a solid electrical connection between said elongated perforated cconductive channel means and said elongated corrugated conductive outer housing whereby said elongated perforated conductive channel means in combination with the interior surface of said elongated corrugated conductive outer housing create low electrical field regions to trap particles.

8. A high voltage gas insulated transmission line as recited in claim 7 wherein said elongated conductor is comprised of a conducting cable mounted in a corrugated metallic housing.

9. A high voltage gas insulated transmission line as recited in claim 7 wherein said insulating means has slot means for supporting said elongated perforated conductive channel means.

10. A high voltage gas insulated transmission line as recited in claim 7 wherein said insulating means is generally comprised of two parts of low dielectric constant material each having slot means for supporting said elongated perforated conductive channel means, said two parts being combined as one and supporting said elongated perforated conductive channel means in said slot means.

11. A high voltage gas insulated transmission line as recited in claim 7 wherein said elongated perforated conductive channel means is comprised generally of curvilinear surfaces disposed to facilitate movement of contaminating particles into low electric field regions.

12. A flexible high voltage gas insulated transmission line, comprising:
   (a) a flexible elongated corrugated conductive outer housing;
   (b) an insulating gas disposed within said flexible elongated corrugated conductive outer housing;
   (c) an elongated flexible conductor mounted within said flexible elongated corrugated conductive outer housing;
   (d) insulating means disposed within said flexible elongated corrugated conductive outer housing for supporting said elongated flexible conductor, said insulating means being generally comprised of two parts of low dielectric constant material each having slot means for supporting a flexible elongated perforated metallic strip, said two parts being combined as one and supporting a flexible elongated perforated metallic strip in said slot means;
   (e) the flexible elongated perforated metallic strip being disposed within said flexible elongated corrugated conductive outer housing continuous throughout the length of the transmission line and being supported by said insulating means in close proximity to said flexible elongated corrugated conductive outer housing; and
   (f) grounding means for making a solid electrical connection between said flexible elongated perforated metallic strip and said flexible elongated corrugated conductive outer housing whereby said flexible elongated perforated metallic strip in combination with low concavity regions interiorly of said flexible elongated corrugated conductive outer housing create low electric field regions to trap particles.

13. A flexible high voltage gas insulated transmission line as recited in claim 12 wherein said flexible elongated perforated metallic strip has a plurality of cutouts in its edges disposed to facilitate flexibility.

14. A flexible high voltage gas insulated transmission line, comprising:
   (a) a flexible elongated corrugated conductive outer housing;
   (b) an insulating gas disposed within said flexible elongated corrugated conductive outer housing;
   (c) an elongated flexible conductor mounted within said flexible elongated corrugated conductive outer housing;
   (d) insulating means disposed within said flexible elongated corrugated conductive outer housing for supporting said elongated flexible conductor, said insulating means being generally comprised of two parts of low dielectric constant material each having slot means for supporting a flexible elongated perforated conductive channel means, said two parts being combined as one and supporting a flexible elongated perforated conductive channel means in said slot means;
   (e) the flexible elongated perforated conductive channel means being disposed within said flexible elongated corrugated conductive outer housing continuous throughout the length of the transmission line and being supported by said insulating means in close proximity to said flexible elongated corrugated conductive outer housing; and
   (f) grounding means for making a solid electrical connection between said flexible elongated perforated conductive channel means and said flexible elongated corrugated conductive outer housing whereby said flexible elongated perforated conductive channel means in combination with the interior surface of said flexible elongated corrugated conductive outer housing create low electric field regions to trap particles.

15. A flexible high voltage gas insulated transmission line as recited in claim 14 wherein said flexible elongated perforated conductive channel means includes curvilinear surfaces disposed to facilitate movement of particles into low electric field regions.

16. A flexible high voltage gas insulated transmission line as recited in claim 14 wherein said flexible elongated perforated conductive channel means has a plurality of cutouts in its edges disposed to facilitate flexibility.

17. A high voltage gas insulated transmission line, comprising:
   (a) an elongated corrugated conductive outer housing;
   (b) an insulating gas disposed within said elongated corrugated conductive outer housing;
   (c) an elongated conductor mounted within said elongated corrugated conductive outer housing;
   (d) insulating means disposed within said elongated corrugated conductive outer housing for supporting said elongated conductor;
   (e) an elongated conductive rod within said elongated corrugated conductive outer housing and supported by said insulating means in close proximity to said elongated corrugated conductive outer housing; and
   grounding means for making a solid electrical connection between said elongated conductive rod and said elongated corrugated conductive outer housing whereby said elongated conductive rod in combination with low concavity regions interiorly of said elongated corrugated conductive outer housing create low electric field regions to trap particles.

18. A high voltage gas insulated transmission line as recited in claim 17 wherein said elongated conductive rod has a plurality of perforations or cutouts.

19. A high voltage gas insulated transmission line as recited in claim 17 wherein said insulating means comprise snap-in means for supporting said elongated conductive rod.

20. A high voltage gas insulated transmission line as recited in claims 1, 7, 12, 14, or 17 wherein said elongated conductor is comprised of two concentric corrugated conductors disposed to allow longitudinal movement of the inner concentric corrugated conductor to facilitate flexibility.

* * * * *